US012726540B2

(12) United States Patent
Borich et al.

(10) Patent No.: US 12,726,540 B2
(45) Date of Patent: Sep. 1, 2026

(54) INTENT AGGREGATION

(71) Applicant: International Business Machines Corporation, Armonk, NY (US)

(72) Inventors: Franco Vincent Borich, Naperville, IL (US); Adam Gray, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 18/772,545

(22) Filed: Jul. 15, 2024

(65) Prior Publication Data

US 2026/0019466 A1 Jan. 15, 2026

(51) Int. Cl.

| | |
|---|---|
| ***H04L 12/24*** | (2006.01) |
| ***H04L 41/0803*** | (2022.01) |
| ***H04L 67/1097*** | (2022.01) |

(52) U.S. Cl.
CPC ................................ *H04L 67/1097* (2013.01)

(58) Field of Classification Search
CPC .................................................. H04L 67/1097
USPC .......................................................... 709/217
See application file for complete search history.

(56) References Cited

U.S. PATENT DOCUMENTS

| | | | | |
|---|---|---|---|---|
| 9,998,147 | B1 * | 6/2018 | Dubucq ............ | H03M 13/6566 |
| 10,546,257 | B2 | 1/2020 | Dunne et al. | |
| 11,126,361 | B1 | 9/2021 | Shveidel et al. | |
| 2014/0215127 | A1 * | 7/2014 | Perrin ................ | G06F 16/2358<br>711/114 |
| 2017/0262516 | A1 * | 9/2017 | Horowitz .............. | G06F 16/254 |
| 2017/0323237 | A1 * | 11/2017 | Dunne ............. | G06Q 10/06312 |
| 2021/0286537 | A1 * | 9/2021 | Shveidel ................ | G06F 3/061 |

OTHER PUBLICATIONS

Lai, et al, "Method and System for Determining Intent of a User Query", IPCOM000204187D, IP.com, Feb. 17, 2011, 6 pages.

* cited by examiner

*Primary Examiner* — Moustafa M Meky
*Assistant Examiner* — Elizabeth Kassa
(74) *Attorney, Agent, or Firm* — CANTOR COLBURN LLP; Stephen Yoder

(57) ABSTRACT

Examples described herein provide a computer-implemented method for intent aggregation. The method includes identifying an affinity between intent functions where serial execution forms a logical sequence that reduces a number of times any subsequent function is executed, the intent functions determined from a plurality of user operations. The method further includes determining a sequence for aggregation and execution of the intent functions. The method further includes executing the intent functions in the sequence to reduce a number of times that subsequent functions are executed.

19 Claims, 6 Drawing Sheets

INTENT AGGREGATION

BACKGROUND

The present disclosure relates to computing environments, and more specifically, to intent aggregation.

Cloud storage systems allow users to save data on remote servers accessed via the internet. These systems use a network of data centers managed by third-party providers. When users upload data, the data is often segmented, encrypted, and distributed across multiple servers for storage.

Cloud storage systems offer high availability and redundancy by replicating data across different locations, ensuring that the data remains accessible even if one server fails. Users can access their data from any device with internet connectivity, providing flexibility and convenience. Additionally, cloud storage services often include features like automated backups, version control, and scalable storage capacity to accommodate growing data needs. Overall, cloud storage systems provide a reliable, secure, and scalable solution for data management, eliminating the need for on-premises hardware and reducing the complexity of data storage and maintenance.

SUMMARY

According to an embodiment, a computer-implemented method for intent aggregation is provided. The method includes identifying an affinity between intent functions where serial execution forms a logical sequence that reduces a number of times any subsequent function is executed, the intent functions determined from a plurality of user operations. The method further includes determining a sequence for aggregation and execution of the intent functions. The method further includes executing the intent functions in the sequence to reduce a number of times that subsequent functions are executed.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

Figure 1:
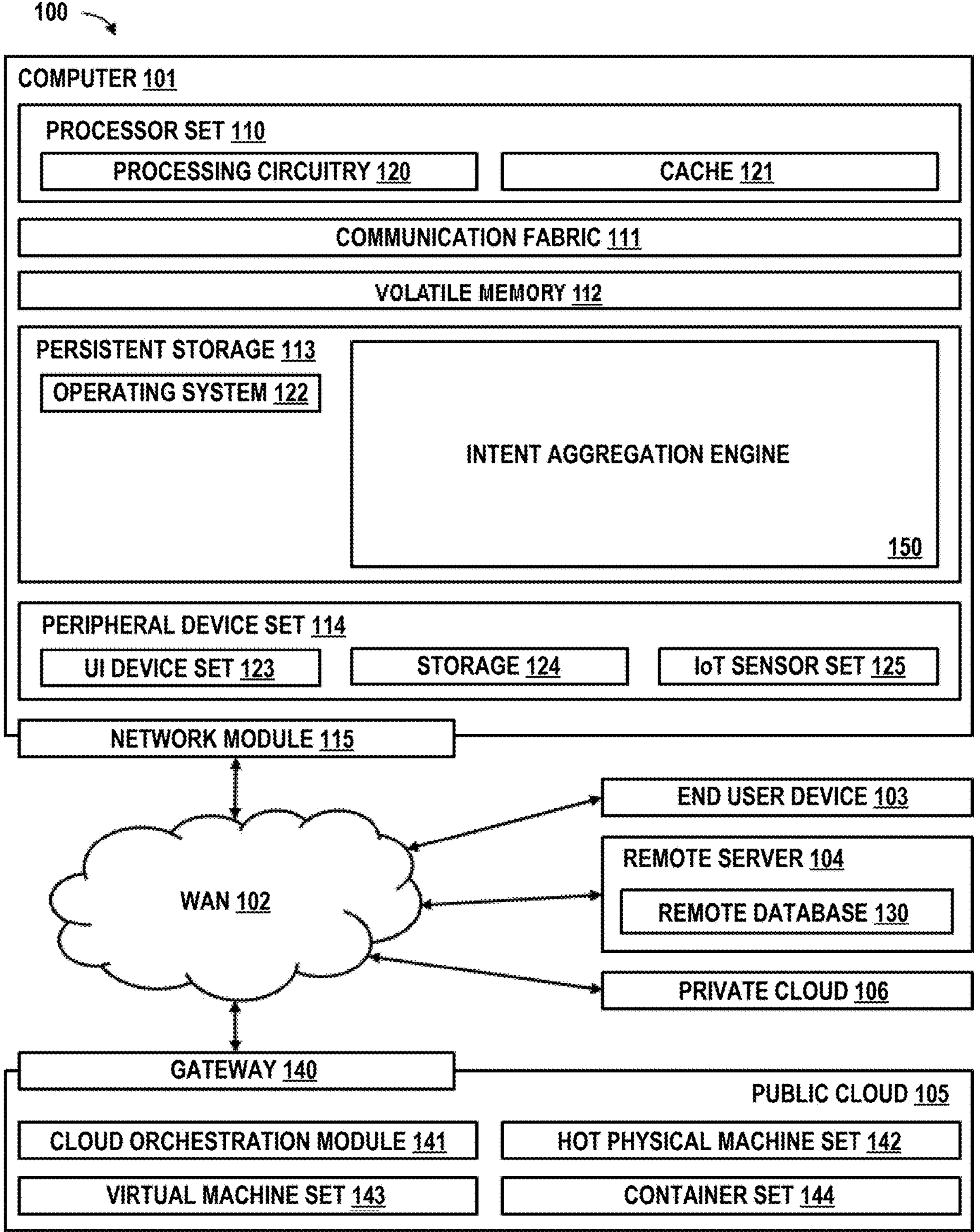
FIG. 1 illustrates a computing environment, according to one or more embodiments.

The detailed description explains embodiments of the disclosure, together with advantages and features, by way of example with reference to the drawings.

DETAILED DESCRIPTION

One or more embodiments described herein provide for intent aggregation in a cloud storage system.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as an intent aggregation engine 150 for performing cache governance in a computing environment with multiple processors. In addition to intent aggregation engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and intent aggregation engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in intent aggregation engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in intent aggregation engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to one or more embodiments, the computing environment 100 can provide for remote data storage. For example, the computer 101 can be a cloud storage system or other suitable system for storing data that is accessible to a user remotely, such as by accessing the computer 101 using the end user device 103. That is, a user can send a user operation (also referred to as a "user request") from the end user device 103 to the computer 101 via the WAN 102. Although the user operation may appear to be simple, such as uploading an object to a cloud storage system, the complications of operating a cloud computing system often have side effects and produce ancillary data, which may be consumed by both the operator of the system (e.g., the computer 101) and by users or other components of the cloud architecture (e.g., the computing environment 100). Ancillary data may be created by user operations that trigger the creation of the ancillary data. Ancillary data may be resource consumption information, notification data, and/or the like, including combinations and/or multiples thereof. Data for an independent event may be inferred from another event (e.g., event to update resource consumption information for an entity in a system also means that the total consumption information for the oner of the entity is also updated).

Cloud storage, along with other data systems, such as databases or processing systems, often use mechanisms for side effects or for maintaining consistency. Such mechanisms may be referred to as "journals," "write-ahead logs," or "intents." Intents may include operational information, encoded functions, data, or text-based logs that provide for consistency and reliable side-effect functions. Some intents may be linked in terms of side effects, such as in terms of usage and billing operations, which have semantic and logical links between the data consumed and produced as arguments to their functions. In some cloud storage applications, data for usage may be independently calculated and delivered. Each intent execution and consumption results in input/output (I/O) operations on the cloud storage system (e.g., the computer 101), which is likely the most contended, expensive, and limited resource for cloud providers. Event aggregation is a technique used to reduce write rate and prevent resource contention. Multiple events are combined into a single event. A single operation can trigger multiple ancillary events that are aggregated independently and processed in parallel.

In some design approaches to handling intent, user operations create an intent for each side effect desired. This causes a single I/O operation per intent created. After the creation, each intent type is aggregated independently, which causes a minimum of two I/O operations per intent. This overhead causes negative performance and reliability impacts on the cloud computing system. Finally, each aggregated intent type is then executed, causing the intended side effect to be visible to interested parties.

One or more embodiments address these and other shortcomings by providing an improved approach to intent aggregation. One or more embodiments utilizes affinity between known intent types and functions to remove the massive overhead of the one-to-many relationship between user operations and intent types. In one example, a known side effect common to cloud storage systems is tracking of usage for billing systems, although other side effects are also possible. Billing, usage, and storage are most likely different systems with different models of consistency, availability, and partition tolerance. The cloud storage system informs the billing and usage system mechanisms and may be flexible to the constraints of the other systems, hence why intents are used.

One or more embodiments described herein provide for designing improved approaches to recognize affinity between intent types and using the relationship of data types and functions to utilize the output of previous aggregation steps as input to intent functions that share an affinity. The example in FIG. 6, for example, which is described further herein, indicates the affinity between usage intents, as accounts may have many buckets (also referred to as "containers"), but there is one account per bucket. This provides for aggregation of intents to utilize the output of each bucket aggregation as input for the account aggregation, saving potentially orders of magnitude of I/O operations, thereby improving the functioning of the cloud computing system.

Figure 2:
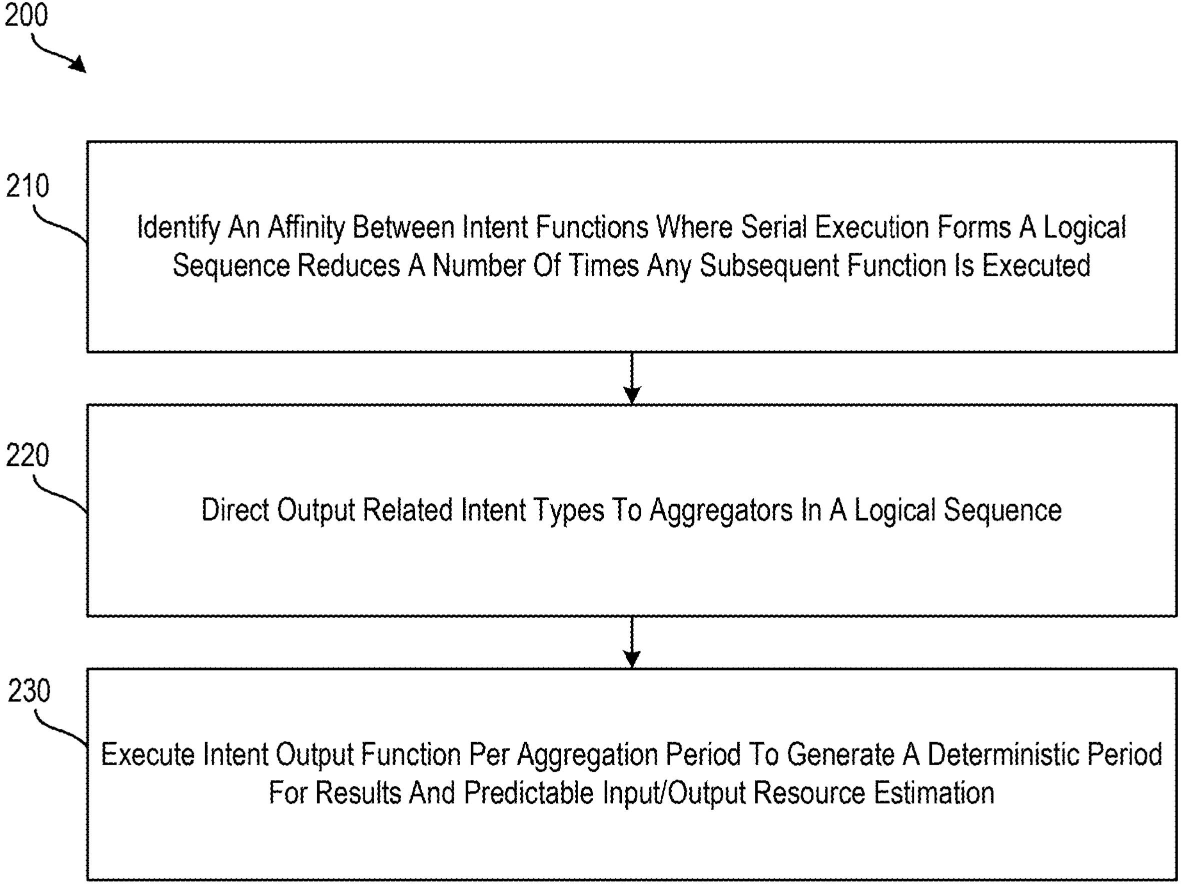
FIG. 2 illustrates a flow diagram of a method for intent aggregation according to one or more embodiments.

FIG. 2 illustrates a flow diagram of a method 200 for intent aggregation, according to an embodiment. The method 200 can be performed by any suitable computing system, device, or environment, such as those described herein. The method 200 is now described with reference to the computing environment 100 of FIG. 1 but is not so limited. The method 200 is further described with reference to methods 300-500 of FIGS. 3-5, respectively, but is not so limited.

Figure 3:
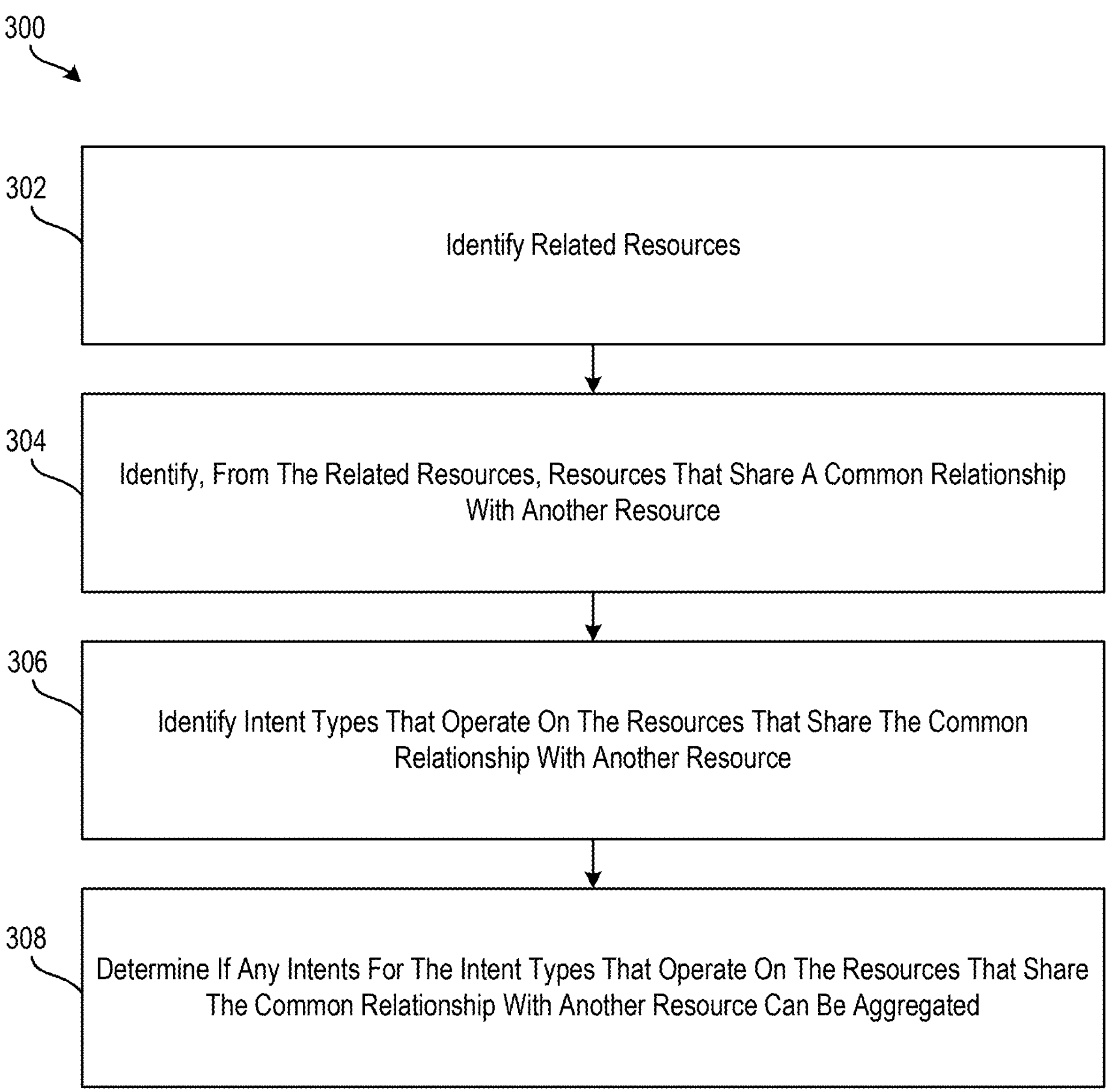
FIG. 3 illustrates a flow diagram of a method for identifying the affinity between intent functions, according to one or more embodiments.

At block 210, the intent aggregation engine 150 identifies an affinity between intent functions where serial execution forms a logical sequence that reduces a number of times any subsequent function is executed. The intent functions are determined from a plurality of user operations. These types of relationships occur when independent functions targeted at different resources are executed in parallel and produce aggregated outputs that are also applied to other shared common resource(s). At block 210, the intent aggregation engine 150 can implement a method 300, as depicted in FIG. 3, for identifying the affinity between intent functions, according to one or more embodiments. At block 302 of the method 300, the intent aggregation engine 150 identifies related resources (e.g., an object stored in a bucket). At block 304, the intent aggregation engine 150 identifies, from the related resources, resources that share a common relationship with another resource. A common relationship occurs when multiple entities are related to the same entity. For example, a user entity can own multiple bucket entities. In this case, the bucket entities share a common relationship with the user entity. Any entity can have multiple common relationships with other entities. For example, a user entity may own multiple data buckets and multiple compute resources. At block 306, the intent aggregation engine 150 identifies intent types that operate on the resources that share the common relationship with another resource. At block 308, the intent aggregation engine 150 determines if any intents for the intent types that operate on the resources that share the common relationship with another resource can be aggregated. For example, intents can be aggregated if the events that those intents represent are suitable for aggregation. Events that can be combined into a single event and have no strict ordering requirement may be aggregated periodically. Those intents that are determined to be aggregatable are identified as having the affinity.

Figure 4:
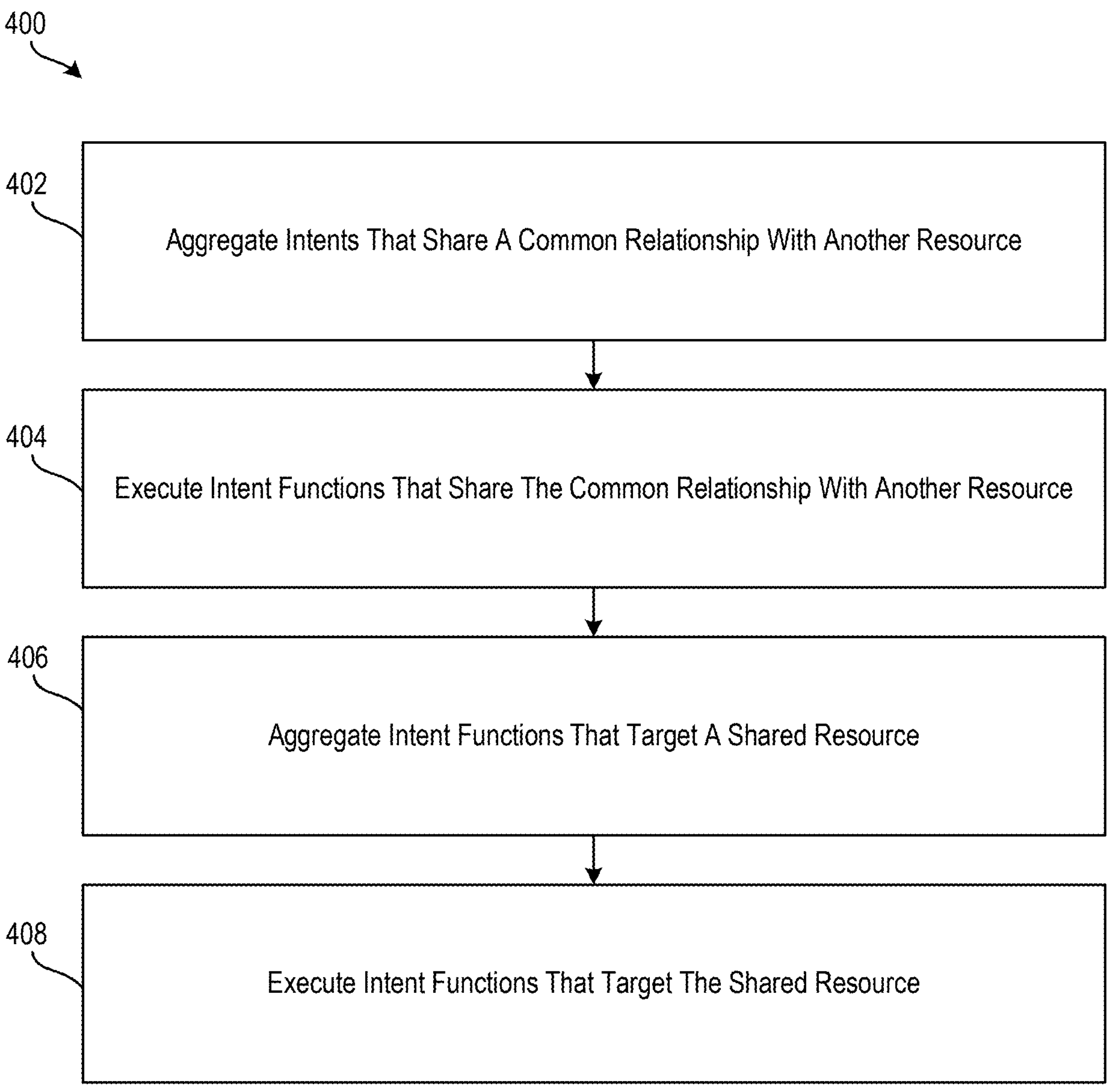
FIG. 4 illustrates a flow diagram of a method for determining the sequence for aggregation and execution of the intent functions, according to one or more embodiments.

With continued reference to FIG. 2, at block 220, the intent aggregation engine 150 determines a sequence for aggregation and execution of the intent functions. For example, after any applicable intent function relationships are identified at block 210 (e.g., using the method 300), the intent aggregation engine 150 determines the optimal ordering (e.g., a sequence) for aggregation and execution of intent functions. According to one or more embodiments, this is performed using the output of a precursor function that operates on aggregated data as input for a subsequent function. This approach reduces the number of times the subsequent function(s) is called. At block 220, the intent aggregation engine 150 can implement a method 400, as depicted in FIG. 4, for determining the sequence for aggregation and execution of the intent functions, according to one or more embodiments. At block 402 of the method 400, the intent aggregation engine 150 aggregates intents that share a common relationship with another resource. At block 404 of the method 400, the intent aggregation engine 150 executes intent functions that share the common relationship with another resource. At block 406 of the method 400, the intent aggregation engine 150 aggregates intent functions that target a shared resource. At block 408 of the method 400, the intent aggregation engine 150 executes intent functions that target the shared resource.

Figure 5:
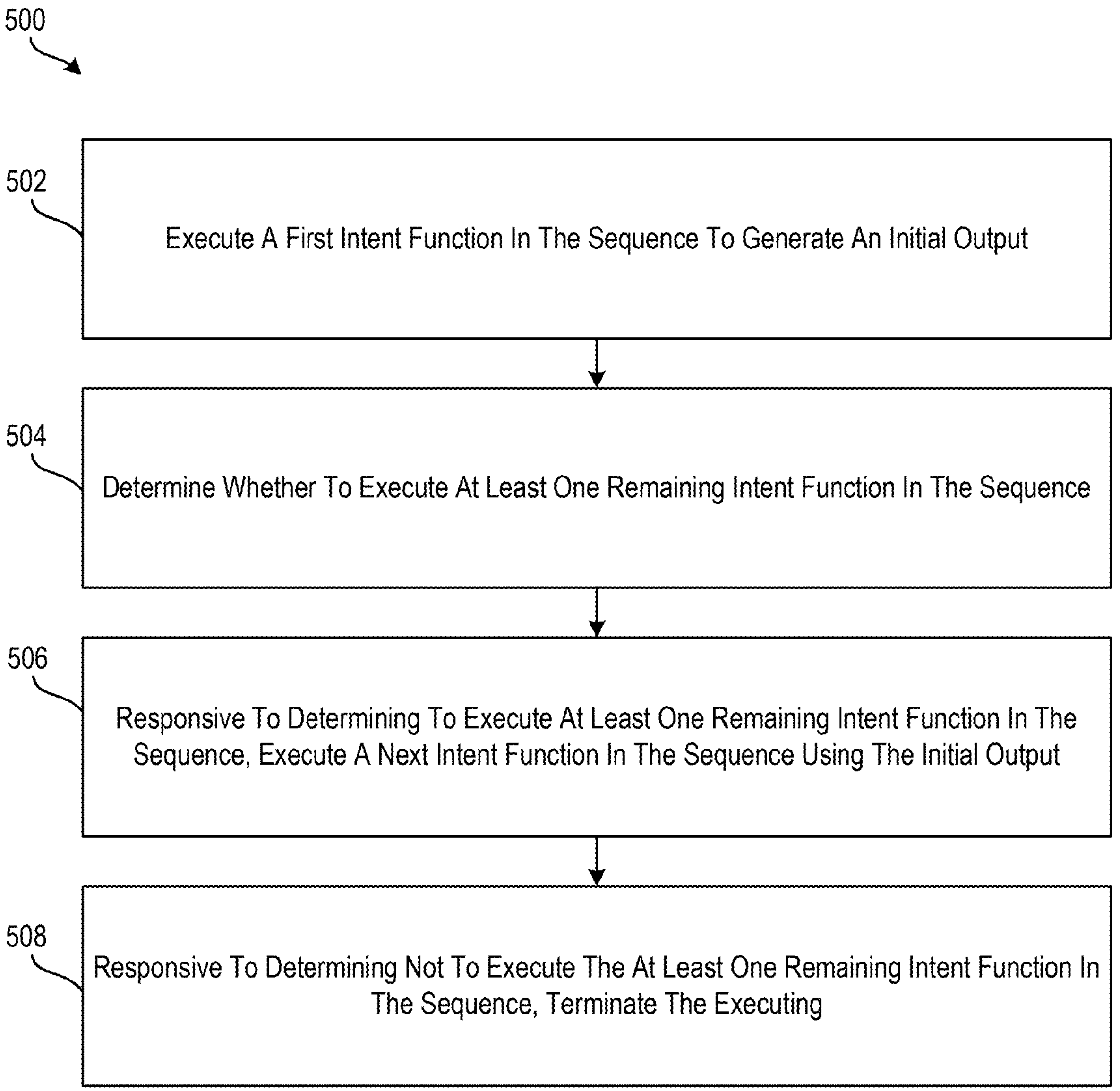
FIG. 5 illustrates a flow diagram of a method for executing the intent functions in the sequence, according to one or more embodiments.

With continued reference to FIG. 2, at block 230, the intent aggregation engine 150 executes the intent functions in the sequence to reduce a number of times that subsequent functions are executed. For example, the intent aggregation engine 150 executes the function sequence to reduce the number of times subsequent functions are executed. According to one or more embodiments, it is possible that the execution of a function produces output that is not a useful input for the next function in the sequence. In such cases, the remaining function(s) in the sequence are not executed. At block 230, the intent aggregation engine 150 can implement a method 500, as depicted in FIG. 5, for executing the intent functions in the sequence, according to one or more embodiments. At block 502 of the method 500, the intent aggregation engine 150 executes a first intent function in the sequence to generate an initial output. At block 504 of the method 500, the intent aggregation engine 150 determines whether to execute at least one remaining intent function in the sequence. According to one or more embodiments, if applying the aggregated intent function will result in no meaningful change, then the intent may be discarded. For example, if one event in an aggregated batch of events incremented a counter and another event in the same batch decremented the counter, the net result for the aggregated intent would be to add "0" to the counter, thus having no impact. At block 506 of the method 500, the intent aggregation engine 150, responsive to determining to execute at least one remaining intent function in the sequence, executes a next intent function in the sequence using the initial output. According to one or more embodiments, the functions performed at block 506 and 508 can be repeated iterative until all functions in the sequence have been executed and/or until it is determined to terminate the sequence. At block 508 of the method 500, the intent aggregation engine 150, responsive to determining not to execute the at least one remaining intent function in the sequence, terminating the executing (block 506).

Additional processes also may be included, and it should be understood that the processes depicted in FIGS. 2-5 represent illustrations, and that other processes may be added or existing processes may be removed, modified, or rearranged without departing from the scope of the present disclosure. It should also be understood that the processes depicted in FIGS. 2-5 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Figure 6:
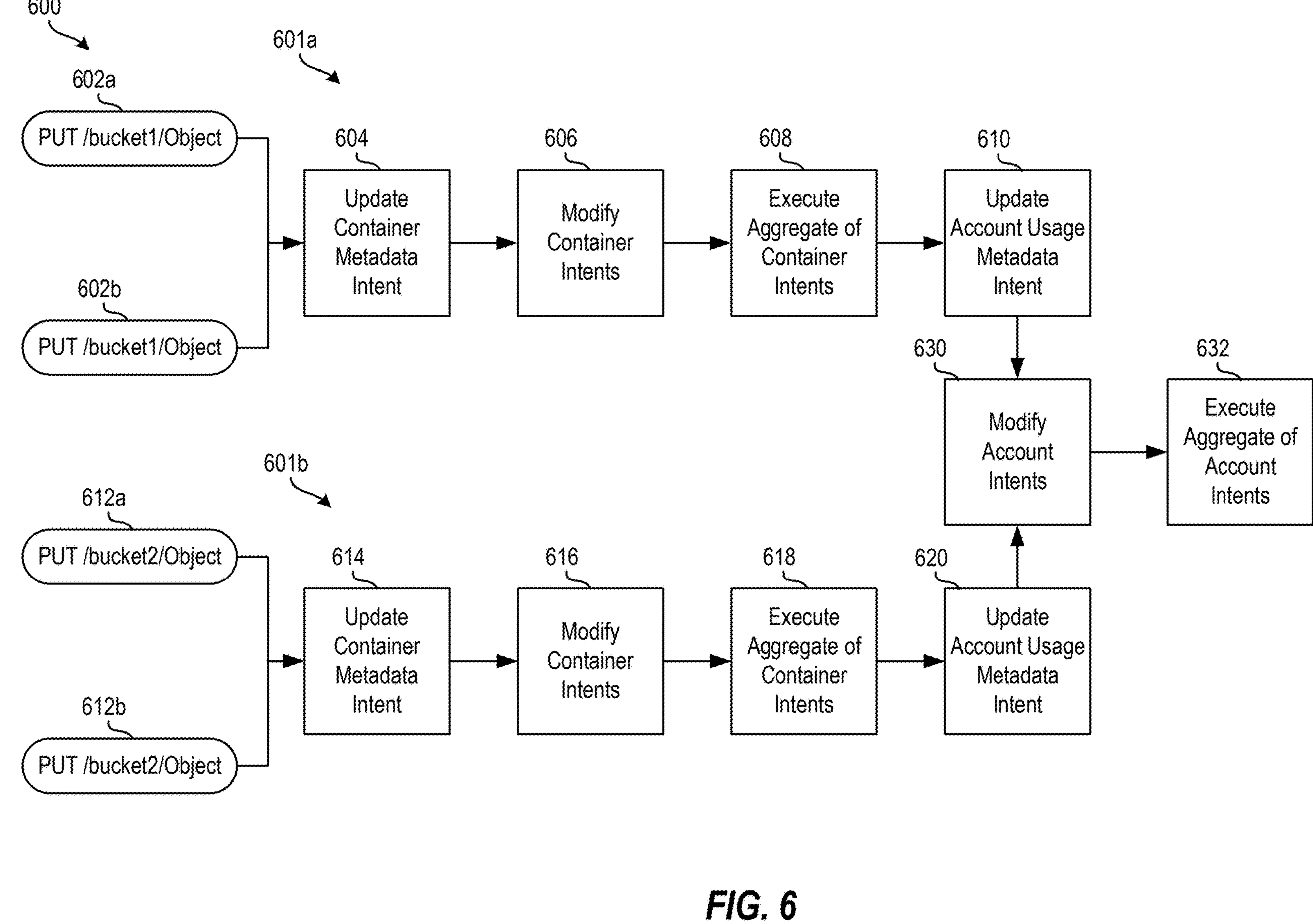
FIG. 6 illustrates a flow diagram of a method for intent aggregation according to one or more embodiments.

Turning now to FIG. 6, a flow diagram of intent aggregation is shown according to one or more embodiments. The method 600 can be performed by any suitable computing system, device, or environment, such as those described herein. The method 200 is now described with reference to the computing environment 100 of FIG. 1 but is not so limited.

The method 600 includes receiving multiple user operations 602*a*, 602*b*, 612*a*, 612*b*, which are "PUT" commands. The user operations 602*a*, 602*b* are "PUT" commands related to an object ("Object," which may also be referred to as a "container") stored in a first bucket ("bucket1"), and the user operations 612*a*, 612*b* are PUT" commands related to an object ("Object) stored in a second bucket ("bucket2").

The user operations 602*a*, 602*b* are said to have an affinity between intent functions because the user operations 602*a*, 602*b* are directed to the same bucket (e.g., "bucket1"). Similarly, the user operations 612*a*, 612*b* are said to have an affinity between intent functions because the user operations 612*a*, 612*b* are directed to the same bucket (e.g., "bucket2"). In this way, FIG. 6 shows two distinct paths (first path 601*a* and second path 601*b*) for aggregation, first at the resource level then at the account level.

Particularly, the first path 601*a* is used for the user operations 602*a*, 602*b*. At block 604, the intent aggregation engine 150 updates container metadata for the intent for the user operations 602*a*, 602*b*. At block 606, the container intents are modified. Block 606 represents a configurable intent aggregation window. At block 608, the intent aggregation engine 150 executes the aggregate of the container intents. At block 610, the intent aggregation engine 150 updates account usage metadata for the intent.

The second path 601*b* is similar to the first path 601*a* except that it is used for the user operations 612*a*, 612*b*. At block 614, the intent aggregation engine 150 updates container metadata for the intent for the user operations 612*a*, 612*b*. At block 616, the container intents are modified. Block 616 represents a configurable intent aggregation window. At block 618, the intent aggregation engine 150 executes the aggregate of the container intents. At block 620, the intent aggregation engine 150 updates account usage metadata for the intent.

Once the first path 601*a* and the second path 601*b* are used to perform resource-level aggregation, results of the blocks 610, 620 are fed into block 630, where account-level aggregation is performed to modify the user account for the intents (e.g., of the user operations 602*a*, 602*b*, 612*a*, and 612*b*). Then, at block 632, the intent aggregation engine 150 executes the aggregate of the account intents.

Additional processes also may be included, and it should be understood that the processes depicted in FIG. 6 represent illustrations, and that other processes may be added or existing processes may be removed, modified, or rearranged without departing from the scope of the present disclosure. It should also be understood that the processes depicted in FIG. 6 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Although one or more embodiments are described herein as applying to computing environments that are based on IBM's z/architecture, it should be appreciated that the embodiments described herein are not so limited to and may be applied to computing environments of other architectures also.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method for performing intent aggregation, the method comprising:

identifying an affinity between intent functions where serial execution forms a logical sequence that reduces a number of times any subsequent function is executed, the intent functions determined from a plurality of user operations;

determining a sequence for aggregation and execution of the intent functions including a bucket-level aggregation followed by an account-level aggregation; and executing the intent functions in the sequence to reduce a number of times that subsequent functions are executed, including updating container metadata based on an aggregate of container intents and updating account usage metadata based on an aggregate of account intents, wherein executing the intent functions in the sequence comprises executing a first intent function in the sequence to generate an initial output.

2. The computer-implemented method of claim 1, wherein identifying the affinity between intent functions comprises identifying related resources.

3. The computer-implemented method of claim 2, wherein identifying the affinity between intent functions further comprises identifying, from the related resources, resources that share a common relationship with another resource.

4. The computer-implemented method of claim 3, wherein identifying the affinity between intent functions further comprises identifying intent types that operate on the resources that share the common relationship with the other resource.

5. The computer-implemented method of claim 4, wherein identifying the affinity between intent functions further comprises determining if any intents for the intent types that operate on the resources that share the common relationship with the other resource can be aggregated.

6. The computer-implemented method of claim 1, wherein determining the sequence for aggregation and execution of the intent functions comprises aggregating intents that share a common relationship with another resource.

7. The computer-implemented method of claim 6, wherein determining the sequence for aggregation and execution of the intent functions further comprises executing intent functions that share the common relationship with the other resource.

8. The computer-implemented method of claim 7, wherein determining the sequence for aggregation and execution of the intent functions further comprises aggregating intent functions that target a shared resource.

9. The computer-implemented method of claim 8, wherein determining the sequence for aggregation and execution of the intent functions further comprises executing intent functions that target the shared resource.

10. The computer-implemented method of claim 1, wherein executing the intent functions in the sequence further comprises determining whether to execute at least one remaining intent function in the sequence.

11. The computer-implemented method of claim 10, wherein executing the intent functions in the sequence further comprises, responsive to determining to execute the at least one remaining intent function in the sequence, executing a next intent function in the sequence using the initial output.

12. The computer-implemented method of claim 11, wherein executing the intent functions in the sequence further comprises, responsive to determining not to execute the at least one remaining intent function in the sequence, terminating the executing.

13. A system comprising:

a memory comprising computer readable instructions; and a processing device for executing the computer readable instructions, the computer readable instructions controlling the processing device to perform operations for intent aggregation, the operations comprising:

identifying an affinity between intent functions where serial execution forms a logical sequence that reduces a number of times any subsequent function is executed, the intent functions determined from a plurality of user operations;

determining a sequence for aggregation and execution of the intent functions including a bucket-level aggregation followed by an account-level aggregation; and executing the intent functions in the sequence to reduce a number of times that subsequent functions are executed, including updating container metadata based on an aggregate of container intents and updating account usage metadata based on an aggregate of account intents, wherein executing the intent functions in the sequence comprises executing a first intent function in the sequence to generate an initial output.

14. The system of claim 13, wherein identifying the affinity between intent functions comprises:

identifying related resources;

identifying, from the related resources, resources that share a common relationship with another resource;

identifying intent types that operate on the resources that share the common relationship with the other resource; and determining if any intents for the intent types that operate on the resources that share the common relationship with the other resource can be aggregated.

15. The system of claim 13, wherein determining the sequence for aggregation and execution of the intent functions comprises:

aggregating intents that share a common relationship with another resource;

executing intent functions that share the common relationship with the other resource;

aggregating intent functions that target a shared resource; and executing intent functions that target the shared resource.

16. The system of claim 13, wherein executing the intent functions in the sequence comprises:

determining whether to execute at least one remaining intent function in the sequence;

responsive to determining to execute the at least one remaining intent function in the sequence, executing a next intent function in the sequence using the initial output; and responsive to determining not to execute the at least one remaining intent function in the sequence, terminating the executing.

17. A computer program product for intent aggregation, the computer program product comprising:

a set of one or more computer-readable storage media;

program instructions, collectively stored in the set of one or more storage media, for causing a processor set to perform the following computer operations:

identify an affinity between intent functions where serial execution forms a logical sequence that reduces a number of times any subsequent function is executed, the intent functions determined from a plurality of user operations;

determine a sequence for aggregation and execution of the intent functions including a bucket-level aggregation followed by an account-level aggregation; and execute the intent functions in the sequence to reduce a number of times that subsequent functions are executed, including updating container metadata based on an aggregate of container intents and updating account usage metadata based on an aggregate of account intents, wherein executing the intent functions in the sequence comprises executing a first intent function in the sequence to generate an initial output.

18. The computer program product of claim 17, wherein identifying the affinity between intent functions comprises:

identifying related resources;

identifying, from the related resources, resources that share a common relationship with another resource;

identifying intent types that operate on the resources that share the common relationship with the other resource; and determining if any intents for the intent types that operate on the resources that share the common relationship with the other resource can be aggregated.

19. The computer program product of claim 17, wherein determining the sequence for aggregation and execution of the intent functions comprises:

aggregating intents that share a common relationship with another resource;

executing intent functions that share the common relationship with the other resource;

aggregating intent functions that target a shared resource; and executing intent functions that target the shared resource.

* * * * *